(12) United States Patent
Ito et al.

(10) Patent No.: US 8,838,257 B1
(45) Date of Patent: Sep. 16, 2014

(54) CONTROLLER AND DESIGN SUPPORT APPARATUS

(75) Inventors: Kiyotada Ito, Hiratsuka (JP); Takahiro Inoue, Chigasaki (JP)

(73) Assignee: Marvell International Ltd., Hamilton (BM)

( * ) Notice: Subject to any disclaimer, the term of this patent is extended or adjusted under 35 U.S.C. 154(b) by 1107 days.

(21) Appl. No.: 12/185,026

(22) Filed: Aug. 1, 2008

Related U.S. Application Data

(60) Provisional application No. 60/977,498, filed on Oct. 4, 2007.

(51) Int. Cl.
*G05B 13/02* (2006.01)
*G11B 5/596* (2006.01)

(52) U.S. Cl.
USPC .......... 700/45; 700/44; 360/78.05; 360/78.12

(58) Field of Classification Search
USPC .................. 700/45, 44; 360/78.05, 78.12
See application file for complete search history.

(56) References Cited

U.S. PATENT DOCUMENTS

| | | | | |
|---|---|---|---|---|
| 3,749,891 | A * | 7/1973 | Burrows et al. | 700/74 |
| 4,035,719 | A * | 7/1977 | Anderson | 324/443 |
| 5,568,456 | A * | 10/1996 | Hayashi et al. | 369/124.01 |
| 6,330,483 | B1 * | 12/2001 | Dailey | 700/28 |
| 6,490,119 | B1 * | 12/2002 | Mittal et al. | 360/78.05 |
| 7,047,312 | B1 * | 5/2006 | Aweya et al. | 709/235 |
| 7,133,236 | B2 * | 11/2006 | Koide et al. | 360/73.03 |
| 7,176,648 | B2 * | 2/2007 | Choi | 318/625 |
| 7,472,585 | B2 * | 1/2009 | Abramovitch | 73/105 |
| 7,711,453 | B2 * | 5/2010 | Yo et al. | 700/282 |
| 2002/0186440 | A1 * | 12/2002 | Adachi et al. | 359/181 |
| 2003/0016607 | A1 * | 1/2003 | Cho et al. | 369/47.42 |
| 2003/0060818 | A1 * | 3/2003 | Kannenberg et al. | 606/34 |
| 2004/0084015 | A1 * | 5/2004 | Sun et al. | 123/399 |
| 2005/0254598 | A1 * | 11/2005 | Zhidkov et al. | 375/316 |
| 2006/0025087 | A1 * | 2/2006 | Nilsson | 455/115.1 |
| 2006/0039079 | A1 * | 2/2006 | Kobayashi et al. | 360/78.05 |
| 2006/0190100 | A1 * | 8/2006 | Weggel | 700/37 |
| 2007/0191967 | A1 * | 8/2007 | Yo et al. | 700/1 |
| 2008/0065257 | A1 * | 3/2008 | He et al. | 700/175 |

OTHER PUBLICATIONS

Washington et al. "Simulink Tutorial", Spring 2002, The Intelligent Structures and Systems Laboratory Department of Mechanical Engineering the Ohio State University, pp. 1-34.*

Edwards et al., "An anti-windup scheme with closed-loop stability considerations", 1999, Pergamon, Automatica 35, pp. 761-765.*

J.M. Gomes da silva Jr, "Anti-Windup design with guaranteed regions of stability for discrete-time linear systems", American Control Conference 2004, IEEE, vol. 6, pp. 5298-5303.

* cited by examiner

*Primary Examiner* — Kavita Padmanabhan
*Assistant Examiner* — Jason Lin
(74) *Attorney, Agent, or Firm* — Fish & Richardson P.C.

(57) ABSTRACT

Methods, systems, and computer program products for compensating unstable linear time-invariant due to input nonlinearities are described. In one implementation, compensating a controlled device may include controlling the controlled device using feedforward control. In another implementation, compensating the controlled device may include controlling the controlled device using feedback control.

27 Claims, 13 Drawing Sheets

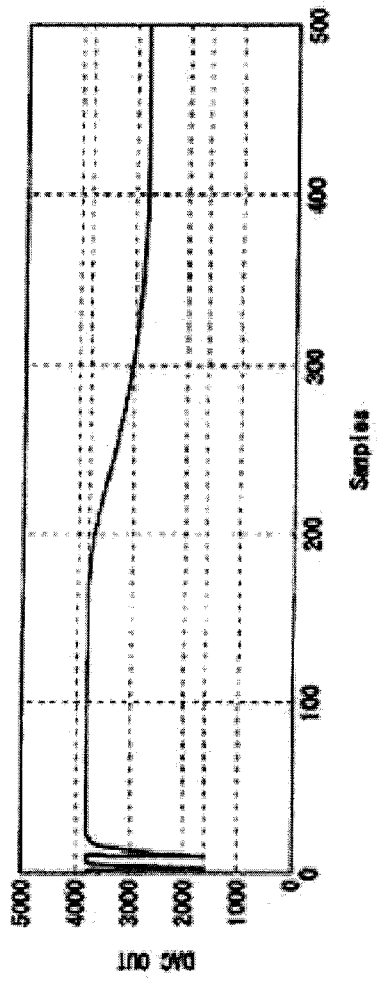
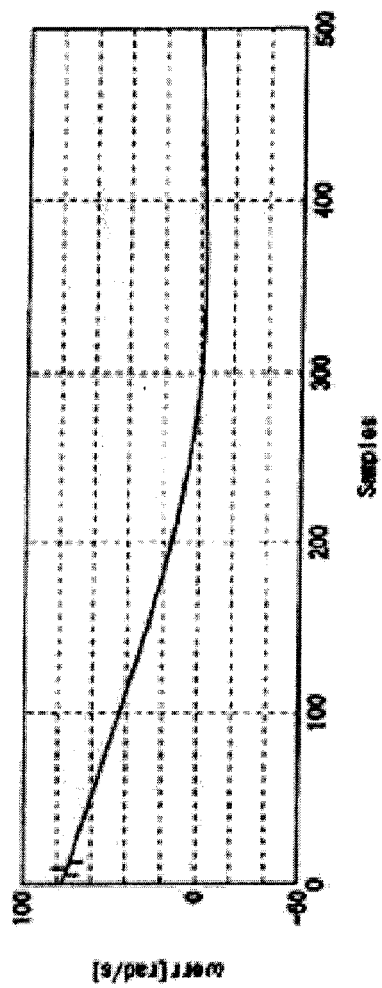
FIG. 7A
FIG. 7B

CONTROLLER AND DESIGN SUPPORT APPARATUS

CROSS REFERENCE TO RELATED APPLICATIONS

This application claims priority to U.S. Provisional Application Ser. No. 60/977,498, titled "ANTI-WINDUP SPINDLE SPEED CONTROL DESIGN," filed on Oct. 4, 2007, the disclosure of which is incorporated herein by reference in its entirety.

TECHNICAL FIELD

The subject matter as described herein is generally related to servo applications.

BACKGROUND

One way to maintain a controlled device at a desired level (e.g., as measured by a control output of the controlled device) is to implement a controller which sends a control signal to manage a control input of the controlled device. A conventional controller is generally designed with a limiter to prevent the control input from exceeding a given level. However, when the control signal becomes saturated, the controller and the controlled device can become functionally unstable. If the control signal overshoots a given level, the overshoot can restrict the controlled device from reaching the desired level.

One conventional way to resolve this problem is to implement anti-windup control. The aim of anti-windup control is to modify the dynamics of a control loop when the control signal saturates so that a good transient behavior may be attained after de-saturation, while avoiding limit cycle oscillations and repeated saturations. However, because of the complexity of anti-windup control, conventional anti-windup schemes are mostly heuristic in nature, and do not address the saturation problem with stability guarantees and enhanced performance.

SUMMARY

A new saturation control technique and apparatus is described for compensating unstable linear time-invariant systems subject to input nonlinearities. The control techniques and apparatus can operate to allow regional stability in the existence of input saturation, and provide less conservative performance than conventional anti-windup compensation schemes.

In some implementations, a system includes: a control section which operates in a feedback control mode to control a controlled device, a feedforward section which operates in a feedforward control mode to control the controlled device, and a state control section to control the controlled device in a steady state in the feedforward control mode or the feedback control mode.

In some implementations, a system includes: a control section to generate a control value for controlling a controlled device, a limiter to receive the control value and generate a regulated value, an adjusting section to adjust the control value through feedback control based on a difference between the control value and the regulated value, and a state control section to control the controlled device based on the regulated value to allow the controlled device to operate in a steady state.

In some implementations, a method includes: generating a control value for controlling a controlled device, generating a regulated value from the control value, adjusting the control value through feedback control based on a difference between the control value and the regulated value, and controlling a controlled device based on the regulated value to allow the controlled device to operate in a steady state.

In some implementations, a method includes: generating a control value for controlling a controlled device in a feedback control mode, generating a feedforward value for controlling a controlled device in a feedforward control mode, and controlling the controlled device in a steady state by switching between the feedforward control mode and the feedback control mode.

The details of one or more embodiments of the invention are set forth in the accompanying drawings and the description below. Other features and advantages of the invention will be apparent from the description and drawings, and from the claims

DESCRIPTION OF THE DRAWINGS

FIG. 7A is an example graph depicting an error difference ωerr relative to an external force being applied to the controller 100 shown in FIG. 5 when an initial value $X_{c0}$ is not considered.

FIG. 7B is an example graph depicting a voltage value being supplied to a controlled device relative to an external force being applied to the controller 100 shown in FIG. 5 when initial value $X_{c0}$ is not considered.

DETAILED DESCRIPTION

System Overview

Figure 1:
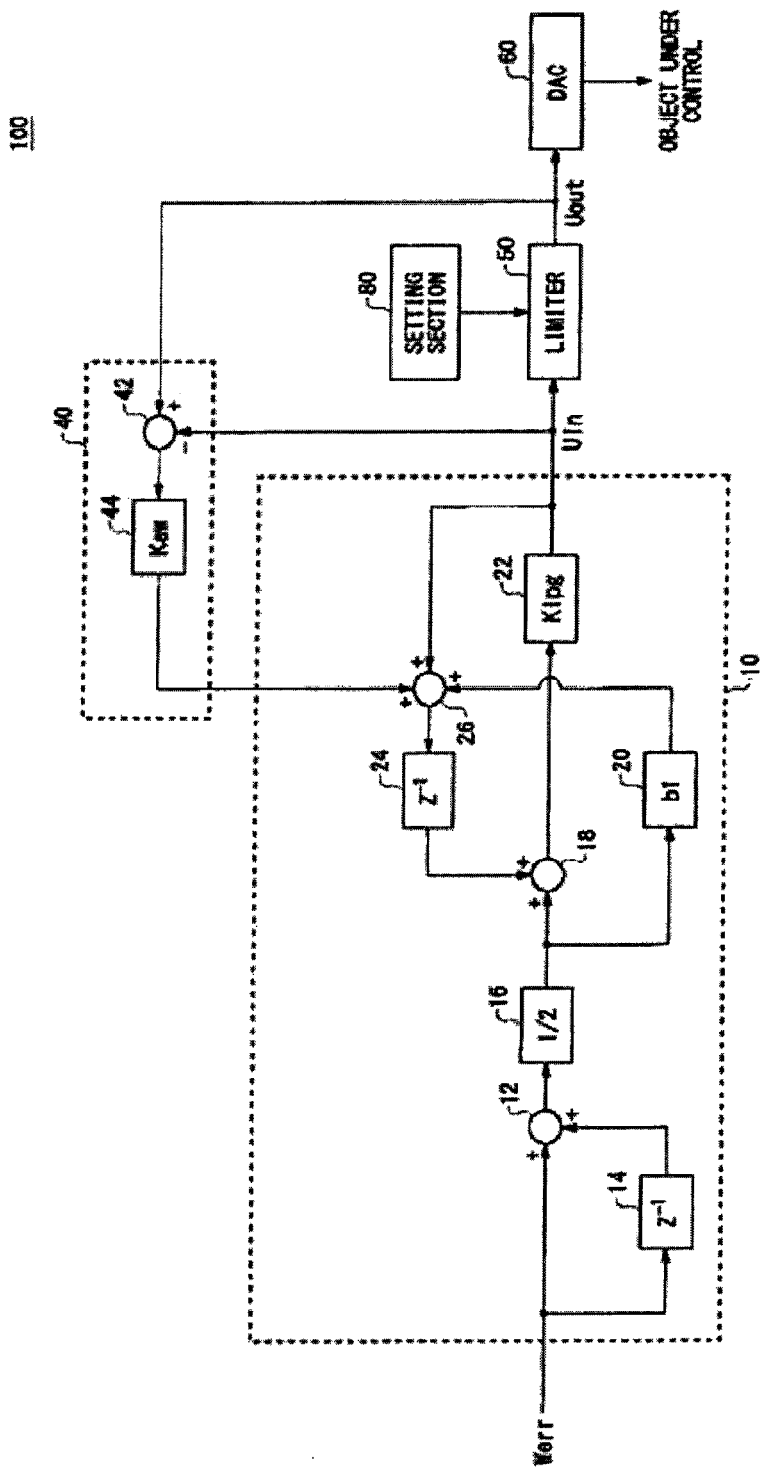
FIG. 1 is a block diagram showing an example of a controller 100.

FIG. 1 is a diagram showing an example of the configuration of a controller 100. The controller 100 may be configured, in some implementations, to control and adjust a controlled device to a desired value using a controlled value. As an example, to configure the controlled device under a steady state, the controller 100 may supply a controlled value to the controlled device, and adjust the controlled value (e.g., continuously or on a periodic basis) so that a physical value of the controlled device can converge to a desired value. In some implementations, the physical value may include, without limitation, the value of rotation velocity of a motor for a spindle or of a hard disk drive. The controller 100 may be an apparatus which controls the physical value of the controlled device to minimize a difference between the physical value and the desired value. The controller 100 may monitor the difference and provide an appropriate controlled value to the controlled device as needed (e.g., based on the rotation velocity of the spindle).

As shown in FIG. 1, the controller 100 may include a control section 10, a limiter 50, an adjusting section 40, a setting section 80, and a state control section 60. The control section 10 may be configured to generate a control value $U_{in}$ for controlling a controlled device. In some implementations, the control value $U_{in}$ may be generated based on an error difference $\omega_{err}$ between a physical value of the controlled device and a desired value. The controller 100 may further include a detecting section (as discussed below) operable to detect the physical value of the controlled device, and a calculating section (as discussed below) operable to determine the error difference $\omega_{err}$ between the detected physical value and the desired value.

Control Section

The control section 10, in some implementations, may include a first adder 12, a first delaying section 14, a first multiplier 16, a second adder 18, a second multiplier 20, a third multiplier 22, a second delaying section 24, and a third adder 26. In these implementations, the first adder 12, the first delaying section 14, and the first multiplier 16 can collectively provide an average of the error difference $\omega_{err}$ supplied to the control section 10, which may be used to generate the control value $U_{in}$.

The first delaying section 14 may delay the error difference $\omega_{err}$ supplied to the control section 10. In some implementations, the amount of delay used by the first delaying section 14 may be substantially equal to an operation cycle of the controller 100. In other implementations, the original error difference $\omega_{err}$ and the error difference $\omega_{err}$ delayed by the first delaying section 14 from different operating cycles may be added to produce a combined value. For example, the first adder 12 may add the error difference $\omega_{err}$ supplied in a current cycle and the error difference $\omega_{err}$ delayed by the first delaying section 14 from a previous cycle to generate a first combined value prior to being sent to the first multiplier 16.

Upon receiving the first combined value, the first multiplier 16 multiplies the value from the first adder 12 by ½. With this configuration, the first multiplier 16 can generate an average value based on, for example, the error difference $\omega_{err}$ in the present cycle and the error difference $\omega_{err}$ in the previous cycle. While the first multiplier 16 is illustrated with a value of ½, other values also are contemplated, and the value selection may depend partially on a specific design and application.

Digital Filter

In some implementations, the average value output by the first multiplier 16 may be output to a digital filter. In these implementations, the digital filter may include the second adder 18, the second multiplier 20, the third multiplier 22, the second delaying section 24 and the third adder 26. Depending on a specific design and application, the digital filter may include a greater or lesser number of components than those described above.

The digital filter, in these implementations, may be configured with an integral characteristic suitable for transferring the average value output by the first multiplier 16 to the limiter 50 based on a transfer function given by [1]:

$$C(z) = K_{1pg} \times (z + b_1)/(z-1) \quad [1]$$

where $K_{1pg}$ is a coefficient of the third multiplier 22, $b_1$ is the coefficient of the second multiplier 20 and $(z-1)$ is an integral term.

The first multiplier 16 forwards the average value to the second adder 18. The second adder 18 receives the average value, and adds a delayed value output by the second delaying section 24 to the average value to produce a second combined value. The third multiplier 22 receives the second combined value, and subsequently multiplies the second combined value by the coefficient $K_{1pg}$ to produce a control value $U_{in}$.

In some implementations, the first multiplier 16 also forwards the average value to the second multiplier 20, and the second multiplier 20 then multiplies the received average value by a predetermined coefficient $b_1$, the output of which is sent to the third adder 26. The third adder 26 adds the value output by the second multiplier 20, the value output by the third multiplier 22, and the value output by the adjusting section 40 (as will be discussed in greater detail below) to obtain a third combined value. The second delaying section 24 delays the third combined value output from the third adder 26, the result of which is subsequently fed back to the second adder 18.

Other configurations of the control section 10 are possible. The control section 10 may have a different configuration from that shown in FIG. 1 as long as such a configuration can yield a similar integral characteristic.

Limiter

Figure 4:
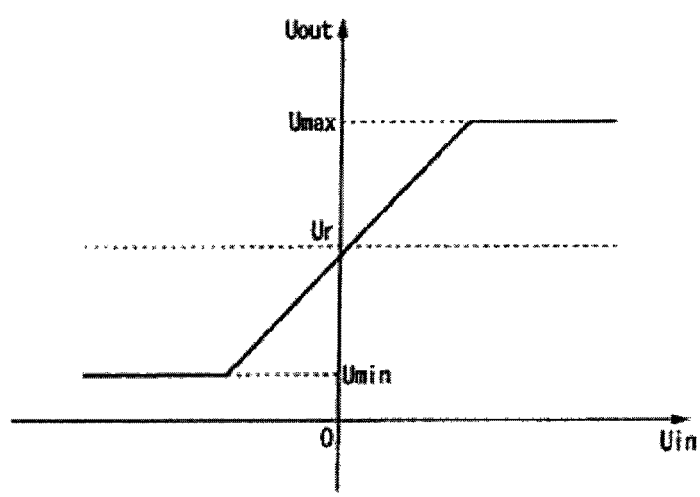
FIG. 4 is a diagram showing an example of a control range of a limiter.

The limiter 50 may receive the control value $U_{in}$ output by the third multiplier 22 to generate a regulated value $U_{out}$, which may be regulated within a predetermined control range having an upper limit $U_{max}$ and a lower limit $U_{min}$ (FIG. 4). In some implementations, if the control value $U_{in}$ lies within a predetermined control range, the limiter 50 may output the control value $U_{in}$ as the regulated value $U_{out}$. In other implementations, if the control value $U_{in}$ is larger than the upper limit $U_{max}$ of the predetermined control range, the limiter 50 may output the upper limit $U_{max}$ as the regulated value $U_{out}$. In yet other implementations, if the control value $U_{in}$ is smaller than the lower limit $U_{min}$ of the predetermined control range, the limiter 50 may output the lower limit $U_{min}$ as the regulated value $U_{out}$.

In some implementations, the predetermined control range of the limiter 50 may be established based on a predetermined range value $U_r$. The predetermined range value $U_r$ may be set by, for example, the setting section 80, as will be discussed in greater detail below. In these implementations, the predetermined range value $U_r$ may be determined to allow for stability at a desired value in a steady state, as will be described in greater detail below with respect to FIGS. 2 and 3.

In some implementations, the predetermined range value $U_r$ lies within the predetermined control range. In these implementations, an offset may be used to define the relationship between the predetermined range value $U_r$ and the upper limit $U_{max}$, and between the predetermined range value $U_r$ and the lower limit $U_{min}$. For example, an offset "a" may be defined, where the difference between the upper limit $U_{max}$ and the predetermined range value $U_r$ and between the lower limit $U_{min}$ and the predetermined range value $U_r$ is the offset "a" (e.g., $U_{max}=U_r+a$ or $U_{min}=U_r-a$). It should be noted that other offsets may be used, and the offset used for the upper limit $U_{max}$ and the lower limit $U_{min}$ may be different.

Setting Section

The setting section 80 may be configured to set the predetermined range value $U_r$. The setting section 80 also may be configured to set the predetermined control range of the limiter 50. For example, the setting section 80 may set the value of the upper limit $U_{max}$ and the lower limit $U_{min}$, and their associated offset(s) with respect to the predetermined range value $U_r$.

To set a suitable range value $U_r$, the setting section 80 may first monitor and detect the output of the limiter 50. The setting section 80 may determine whether the detected output is sufficient to stabilize the controlled device in a steady state. If the detected output is sufficient to stabilize the controlled device in a steady state, the setting section 80 may set the detected output as the predetermined range value $U_r$, or a center value of the control range of limiter 50. By setting the range value $U_r$ as the center value of the limiter's control range while the controlled device is in a steady state, it is possible to maintain the controller 100 in a stable operation. This configuration also allows the controller 100 to provide the controlled device with a larger margin β of a stable region through which the controlled device may operate, as will be discussed in greater detail with respect to FIG. 9.

Adjusting Section

In some implementation, the control value $U_{in}$ may be fed to the adjusting section 40. The adjusting section 40 may be configured to adjust the control value $U_{in}$, generated by the control section 10 based on the difference between the control value $U_{in}$ and the regulated value $U_{out}$. In some implementations, if the control value $U_{in}$ is within the control range of the limiter 50, the control value $U_{in}$ may not be adjusted. Because no adjustment has been performed, the control value $U_{in}$ and the regulated value $U_{out}$ may substantially be identical. In other implementations, if the control value $U_{in}$ is outside the control range of the limiter 50, the adjusting section 40 may perform adjustment to the control value $U_{in}$ so as to minimize the difference between the control value $U_{in}$ and the regulated value $U_{out}$.

The adjusting section 40 may include a fourth adder 42 and a feedback coefficient multiplier 44. The fourth adder 42 subtracts the control value $U_{in}$ input to the limiter 50 from the regulated value $U_{out}$ output by the limiter 50, and outputs a difference value. Subsequently, the feedback coefficient multiplier 44 multiplies the difference value by a preset feedback coefficient $K_{aw}$ to generate an adjustment value and supplies the adjustment value to the third adder 26. This process allows the adjusting section 40 to add the adjustment value (e.g., $K_{aw} \times (U_{out}-U_{in})$) to the control value $U_{in}$ to be generated by the control section 10 in the next operating cycle. With this feedback configuration, it is possible to minimize undershoot or overshoot which may occur when the control value $U_{in}$ reaches saturation.

State Control Section

The state control section 60 controls the controlled device based on the regulated value $U_{out}$ output by the limiter 50. The state control section 60 may include a digital-analog converter which converts the regulated value $U_{out}$ to an analog voltage value. The state control section 60 also may include a driver circuit (not shown) which generates a voltage or a current to be supplied to the controlled device based on the voltage value output by the digital-analog converter.

Example of External Force Measurement

Figure 2:
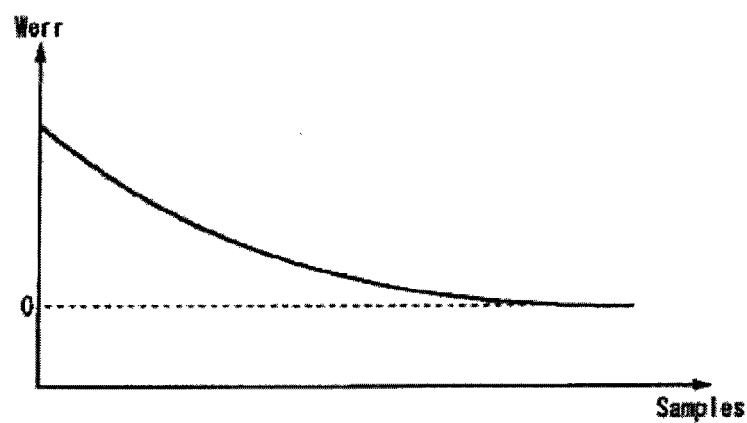
FIG. 2 is an example graph depicting an error difference $\omega_{err}$ relative to an external force.
Figure 3:
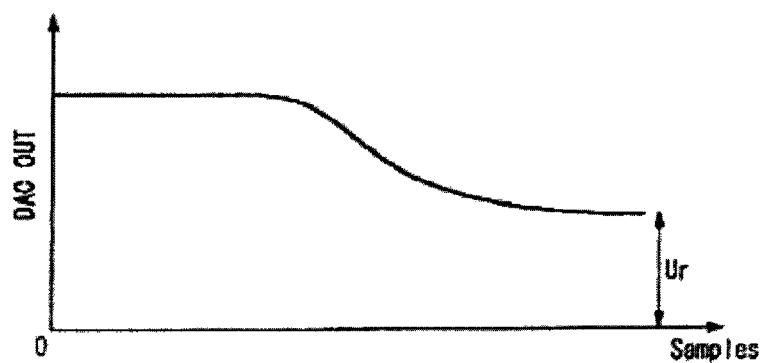
FIG. 3 is an example graph depicting a voltage value being supplied to a controlled device relative to an external force.

FIG. 2 is an example graph depicting an error difference $\omega_{err}$ relative to an external force, where the ordinate axis of FIG. 2 represents the error difference $\omega_{err}$ between the physical value and the desired value of the controlled device. FIG. 3 is an example graph depicting a voltage value being supplied to a controlled device relative to an external force, where the ordinate axis of FIG. 3 represents the level of the voltage value being supplied to a controlled device by the controller 100. The abscissa axis of both FIG. 2 and FIG. 3 represents a time at which values on the ordinate axis are measured.

As shown in FIG. 2, the controlled device may transition into a steady state if the controlled device is stabilized at $\omega_{err}=0$. If there is no external force (e.g., current or voltage) being applied to the controlled device, the voltage value being supplied from the controller 100 to the controlled device after the controlled device has transitioned into the steady state should essentially be 0. However, as shown in FIG. 3, the voltage value after the controlled device has transitioned into the steady state is not zero. Rather, the voltage value at this time corresponds to the external force being applied to the controlled device while the device is in the steady state. For example, if the external force includes a back electromotive force, the external force may be obtained based on the voltage value at that time and the value corresponding to the back electromotive force.

As described above, the setting section 80 may detect the control value $U_{in}$ output by the limiter 50 when the controller device is in a steady state. By setting the range value $U_r$ as a center value of the limiter's control range with an appropriate offset, the controller 100 can further achieve stability.

Control Range of the Limiter

FIG. 4 is a diagram showing one example of a control range of the limiter 50. In FIG. 4, the abscissa axis represents the control value $U_{in}$ supplied to the limiter 50. The abscissa axis also represents the regulated value $U_{out}$ output by the limiter 50. As shown, the control range includes a predetermined range value $U_r$, which is set as the midpoint of the control range.

In some implementations, the range value $U_r$ in a steady state of the controlled device may be set as the center value of the limiter's control range. In other implementations, the range value $U_r$ need not be set as the center value, and a value other than zero may be used as the center value of the limiter's control range. In yet other implementations, a value that lies within a predetermined range with respect to the range value $U_r$ may be set as the center value of the limiter's control range, as will be described in greater detail with reference to FIG. 14. In yet other implementations, a value that is as close to the range value $U_r$ but smaller than half of the range value $U_r$ may be set as the center value of the limiter's control range.

Feedforward Control

Figure 5:
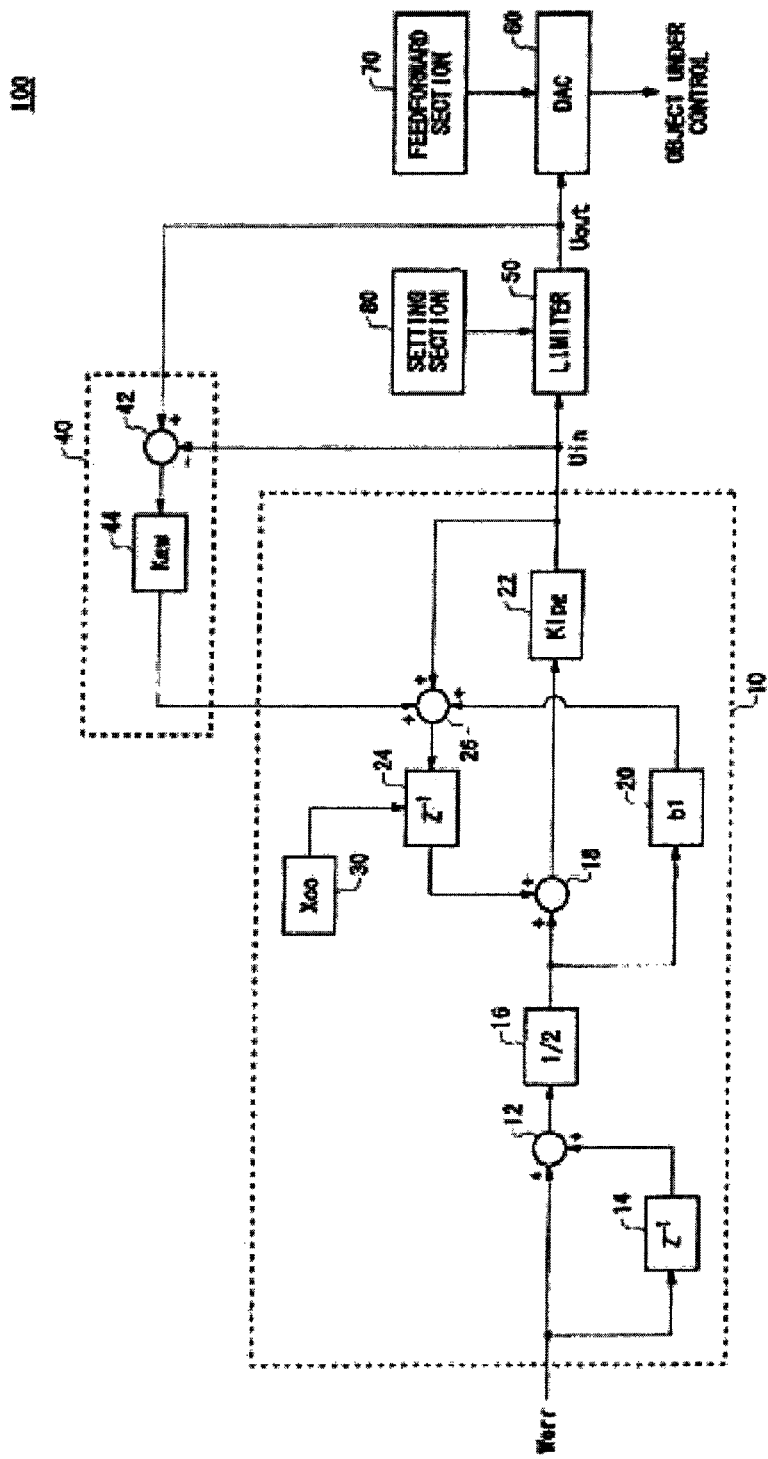
FIG. 5 is a block diagram showing an alternative configuration of the controller 100 shown in FIG. 1.

FIG. 5 is a diagram showing an alternative configuration of the controller 100. As shown in FIG. 5, the controller 100 includes a feedforward section 70 and an initial value storage section 30. The remaining components of the controller 100 may be identical to those of the controller 100 shown in FIG. 1.

Feedforward Section

In some implementations, the feedforward section 70 may generate a feedforward value according to a predetermined profile. The profile may include information that provides a suitable feedforward value based on, without limitation, a physical value of the controlled device and time that has elapsed since switching. The state control section 60 may control the controlled device using the feedforward value generated by the feedforward section 70. The feedforward section 70 may continue to output a feedforward value to the state control section 60 until a point at which the physical value of the controlled device has reached a predetermined switch value. In some implementations, the switch value may be 80% to 90% of the desired value.

Once the physical value of the controlled device has reached the switch value, the control section 10 may generate the control value $U_{in}$. In some implementations, the control value $U_{in}$ may correspond to the switch value, which may be used as the initial value $X_{c0}$ of the control value $U_{in}$. In other implementations, the initial value $X_{c0}$ may be defined such that the feedforward value and the control value $U_{in}$ are continuous. For example, the initial value $X_{c0}$ may be a constant multiple of the feedforward value when the state control section 60 switches from controlling the controlled device using the feedforward value (i.e., feedforward control) to controlling the controlled device using the control value $U_{in}$ (feedback control). In some implementations, the initial value $X_{c0}$ may be given by [2]:

$$X_{c0} = U_0/K_{1pg} - \omega_0 \times K_{vel} \quad [2]$$

where $U_0$ represents the feedforward value at the time of switching, $\omega_0$ represents the error difference between the physical value and the desired value of the controlled device at the time of switching (e.g., switching from feedforward control to feedback control), and $K_{vel}$ represents a predetermined coefficient. In some implementations, the predetermined coefficient $K_{vel}$ may be, for example, a gain when the physical value is detected. The initial value $X_{c0}$, in some implementations, may be set such that the difference between the feedforward value at the time of switching and a value obtained by multiplying the initial value $X_{c0}$ by $K_{1pg}$ is smaller than a value obtained by multiplying the initial value $X_{c0}$ by $K_{1pg}$. The initial value $X_{c0}$ may be a value other than zero.

Initial Value Storage Section

The initial value storage section 30 may be used to pre-store the initial value $X_{c0}$. The initial value $X_{c0}$ may be determined, for example, by the user or the controller 100. In some implementations, the second delaying section 24 may extract the initial value $X_{c0}$ manually from the initial value storage section 30, or alternatively may receive the initial value $X_{c0}$ from the initial value storage section 30. Upon receipt of the initial value $X_{c0}$, the second delaying section 24 outputs the initial value $X_{c0}$ to the second adder 18. With this configuration, the controller 100, which employs a switch based on the feedforward control using the feedforward section 70 and the feedback control using the control section 10, can be stabilized when switching takes place.

Figure 6A:
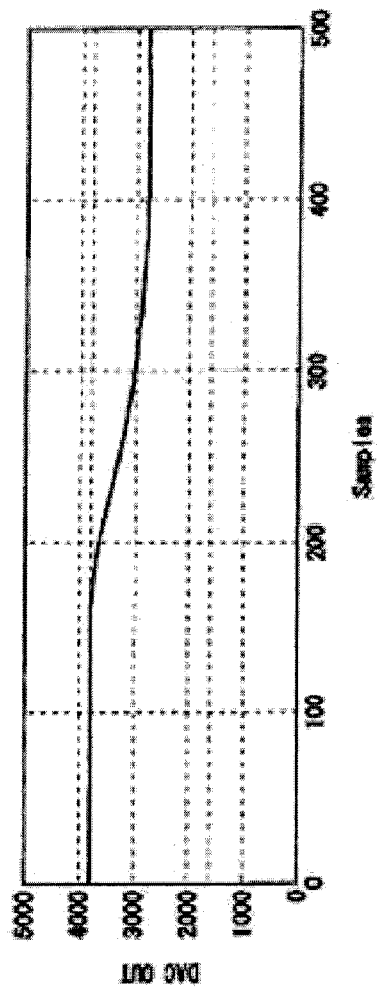
FIG. 6A is an example graph depicting an error difference ωerr relative to an external force being applied to the controller 100 shown in FIG. 5 when an initial value $X_{c0}$ is considered.
Figure 6B:
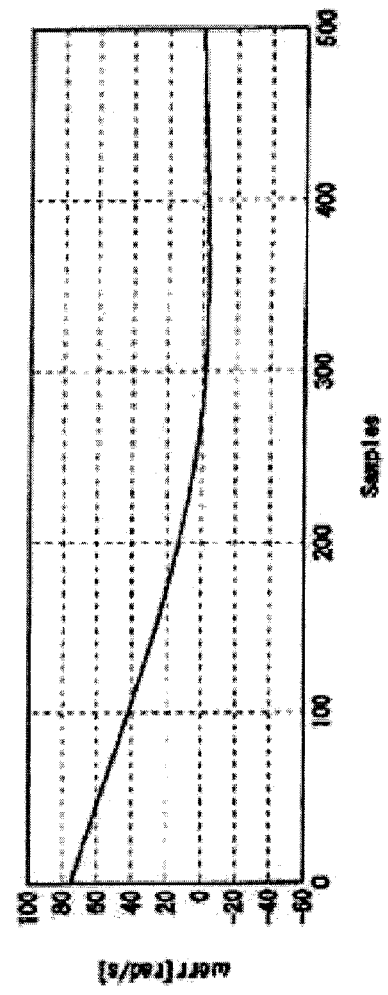
FIG. 6B is an example graph depicting a voltage value being supplied to a controlled device relative to an external force being applied to the controller 100 shown in FIG. 5 when an initial value $X_{c0}$ is considered.

FIG. 6A is an example graph depicting a voltage value being supplied to a controlled device relative to an external force being applied to the controller 100 shown in FIG. 5 when the initial value $X_{c0}$ is considered. FIG. 6B is an example graph depicting an error difference $\omega_{err}$ relative to an external force being applied to the controller 100 shown in FIG. 5 when the initial value $X_{c0}$ is considered. FIG. 7A is an example graph depicting a voltage value being supplied to a controlled device relative to an external force being applied to the controller 100 shown in FIG. 5 when initial value $X_{c0}$ is not considered. FIG. 7B is an example graph depicting an error difference $\omega_{err}$ relative to an external force being applied to the controller 100 shown in FIG. 5 when an initial value $X_{c0}$ is not considered.

The abscissa axis of FIGS. 6A-6b and FIGS. 7A-7B represents the time that has elapsed since switching to the feedback control. The ordinate axis of FIGS. 6A and 7A, and FIGS. 6B and 7B represents the voltage signal (DAC OUT) output by the state control section 60, and the physical value of the controlled device (which can be expressed as $\omega_{err}$), respectively.

As shown in FIGS. 6A-6B, with the initial value $X_{c0}$ set, the controller 100 and the controlled device operate in a stable or steady state at the time of switching. By contrast, as shown in FIG. 7 where the initial value $X_{c0}$ is not set (e.g., $X_{c0}=0$), the controller 100 and the controlled device exhibit unstableness at the time of switching.

Compensation Section

Figure 8:
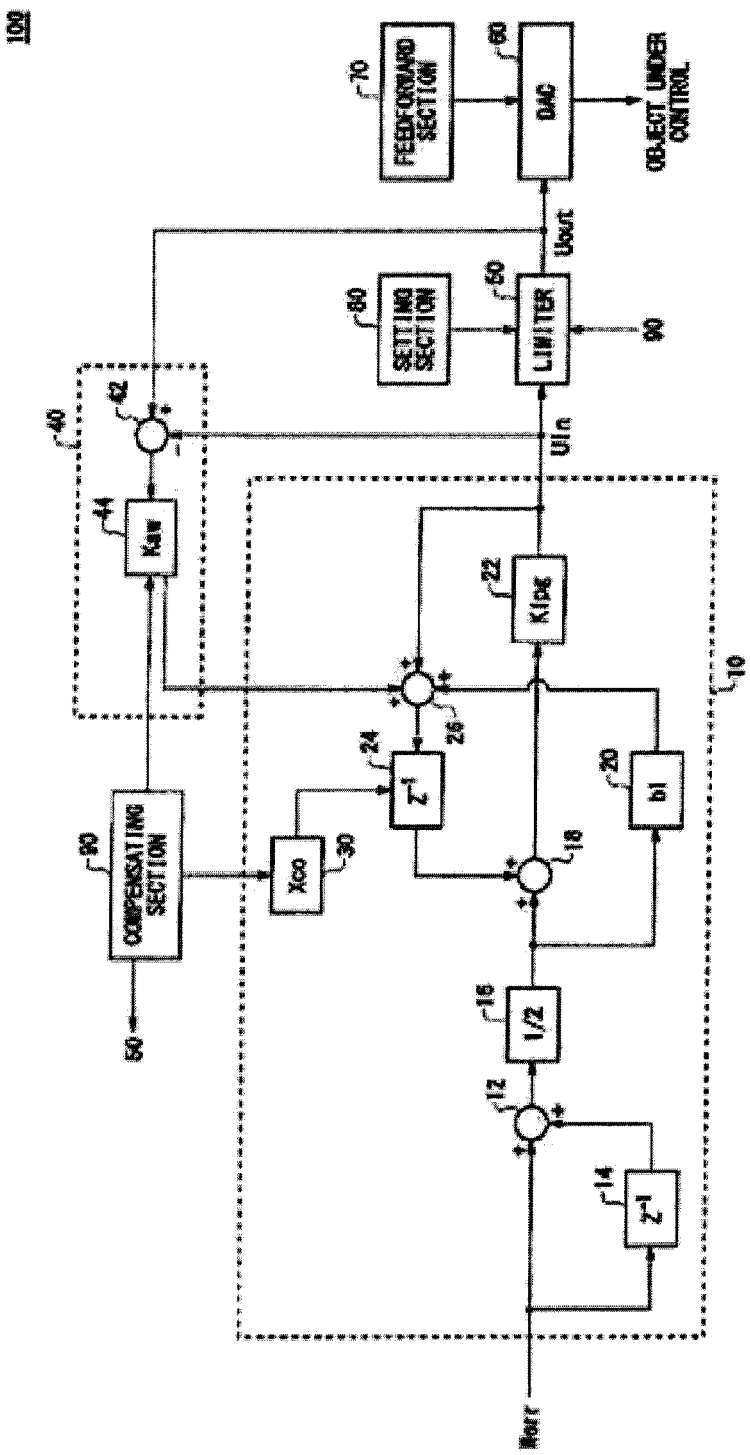
FIG. 8 is a block diagram showing an alternative configuration of the controller 100 shown in FIG. 1.

FIG. 8 is a block diagram showing an alternative configuration of the controller 100. As shown in FIG. 8, the controller 100 includes a compensating section 90. The remaining components of the controller 100 may be identical to those of the controller 100 shown in FIG. 5. In some implementations, the compensating section 90 may be configured to adjust the regulated value $U_{out}$ (or the control value $U_{in}$) based on the temperature or operation duration time of the controlled device. In these implementations, the controller 100 may further include a detecting section (not shown) for detecting the temperature or operation time of the controlled device.

Based on the temperature or the operation duration time of the controlled device, the compensating section 90 also may adjust the feedback coefficient $K_{aw}$ of the feedback coefficient multiplier 44, the initial value $X_{c0}$ of the initial value storage section 30 and the range value $U_r$ of the control range of the limiter 50 accordingly. The adjustment may be performed in a manner that allows the controller 100 to maximize the margin of a stable region through which the controlled device may operate, as will be described below with reference to FIG. 9.

In some implementations, the compensating section 90 may include a table comprising a list of values for each of the feedback coefficient $K_{aw}$, the initial value $X_{c0}$, and the center value $U_r$. In these implementations, the controller 100 (or the user) can access the table to retrieve an appropriate value based on the detected temperature, operation duration time or other parameters of the controlled device. A user may add or modify the values in the table as desired. For example, the user may add one or more compensation values to the table suitable for compensating fluctuations of the parameters of the controlled device. The parameters may include, without limitation, rotation velocity, offset, temperature and operation duration time. These parameters are exemplary, and are not limiting in nature.

Design Support Apparatus

Figure 9:
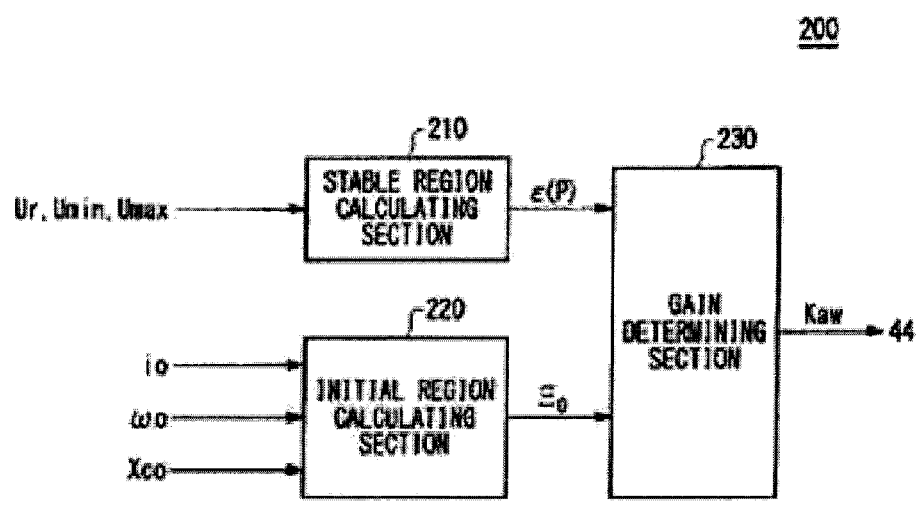
FIG. 9 is a block diagram showing an example of a design support apparatus 200.

FIG. 9 is a block diagram showing one example of a design support apparatus 200. In some implementations, the design support apparatus 200 may be used to determine the feedback coefficient $K_{aw}$ of the adjusting section 40. In some implementations, the design support apparatus 200 may generate an appropriate feedback coefficient $K_{aw}$ which would maximize the margin of a stable region in which the controlled device operates. As shown in FIG. 9, the design support apparatus 200 includes a stable region calculating section 210, an initial region calculating section 220, and a gain determining section 230.

Stable Region Calculating Section

The stable region calculating section 210 receives a range value $U_r$, an upper limit $U_{max}$ and a lower limit $U_{min}$ of the limiter's control range, and calculates a stable region $\epsilon(P)$. The stable region $\epsilon(P)$ may include a range of parameters including a control value $X_c$ and a physical value within which the controlled device can operate stably based on the range value $U_r$, the upper limit value $U_{max}$, and the lower limit value $U_{min}$. In some implementations, the control value $X_c$ and a physical value also may be determined based on an initial value $X_{c0}$ set for the control section 10, in addition to the range value $U_r$, the upper limit value $U_{max}$, and the lower limit value $U_{min}$. The stable region calculating section 210 may generate a state equation of the controller 100 and the controlled device (as will be explained in greater detail with respect to equation [9].

In the following description, the error difference $\omega_{err}$ between the rotation velocity $\omega$ of a spindle of a hard disk and its desired value, and the current I consumed by the spindle will be used as examples of physical values of controlled device. However, one of ordinary skill in the art would readily appreciate that these parameters are not limiting in nature, and other parameters also are applicable.

In some implementations, the stable region $\epsilon(P)$ may be represented as a function whose variables include parameters $(X_c, \omega_{err}, I)$ indicating a state of the controlled device. In these implementation, the stable region $\epsilon(P)$ may be defined as a region where the state of the controlled device converges to a certain state when the controlled device is in this region.

The coefficient of each parameter of the function representing the stable region $\epsilon(P)$ may be defined based on the feedback coefficient $K_{aw}$. In some implementations, if the feedback coefficient $K_{aw}$ is changed, the region enclosed by the stable region $\epsilon(P)$ also changes in an n-dimensional space defined by n axes of parameters. The stable region calculating section 210 may determine the function of the stable region $\epsilon(P)$ based equation [20] as will be discussed in greater detail below.

Initial Region Calculating Section

The initial region calculating section 220 may store one or more initial values of a current, rotation velocity, and control value at the time of switching, and calculates an initial region $\Xi_0$ based on these values. The initial region $\Xi_0$ may include a range of values suitable for extraction when the controller switches from feedforward control to feedback control. For example, the initial region calculating section 220 may calculate a current range $-i_0 < I < i_0$ (where $-i_0$ is the lower limit and $i_0$ is the upper limit of the current I), a rotation velocity range $-\omega_0 \leq \omega \leq \omega_0$ (where $-\omega_0$ is the lower limit and $\omega_0$ is the upper limit of the rotation velocity $\omega$), and an initial region range $-X_{c0} < X_c < X_{c0}$ (where $-X_{c0}$ is the lower limit and $X_{c0}$ is the upper limit of an initial value $X_c$). In some implementations, the ranges $-i_0 < I < i_0$, $-\omega_0 < \omega < \omega_0$ and $-X_{c0} < X_c < X_{c0}$ may be used to describe the initial region $\Xi_0$, as will be described later with respect equation [33].

Gain Determining Section

The gain determining section 230 may be used to determine the feedback coefficient $K_{aw}$ of the adjusting section 40 such that the stable region $\epsilon(P)$ may include the initial region $\Xi_0$, and the margin $\beta$ of the stable region $\epsilon(P)$ with respect to the initial region $\Xi_0$ can be maximized. In some implementations, determining the feedback coefficient $K_{aw}$ may include maximizing the margin $\beta$ such that $\beta \times \Xi_0$ lies within the stable region $\epsilon(P)$. By maximizing the margin $\beta$ of the stable region $\epsilon(P)$, the controller 100 may be optimized to achieve stability and efficiency. The process for determining the feedback coefficient $K_{aw}$ which maximizes the margin $\beta$ of the stable region $\epsilon(P)$ will be described with respect to, for example, equations [1]-[33].

Figure 10:
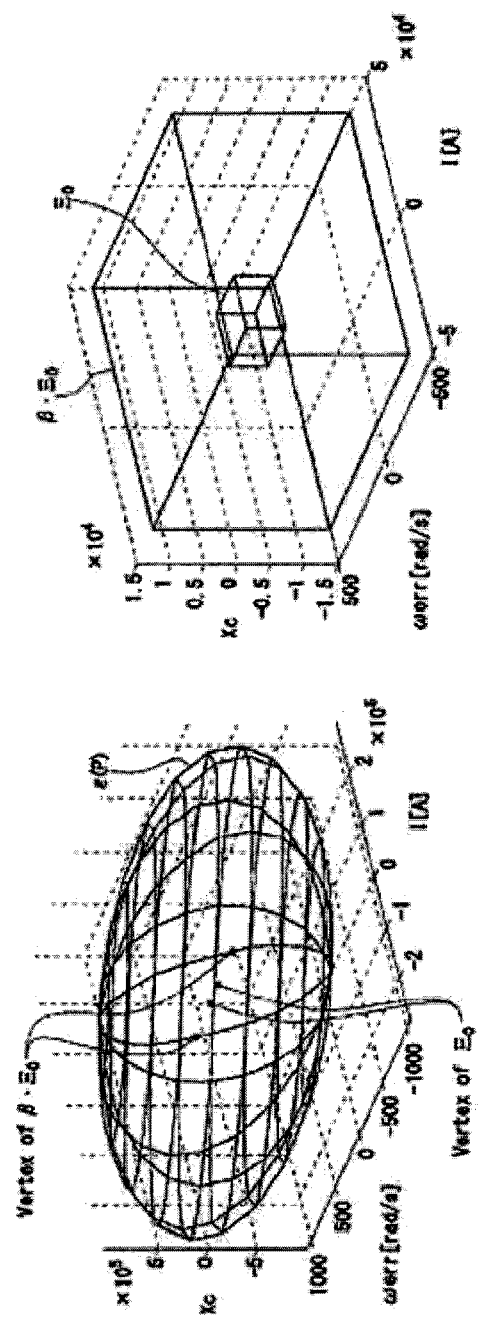
FIG. 10A is a diagram showing an example of a stable region $\epsilon(P)$.
FIG. 10B is a diagram showing an example of an initial region $\Xi_0$.

FIG. 10A is a diagram showing an example of a stable region $\epsilon(P)$, and FIG. 10B is a diagram showing an example of an initial region $\Xi_0$. As described above, the stable region $\epsilon(P)$ and the initial region $\Xi_0$ may be represented as a function with variables that include, without limitation, the initial value $X_c$, error difference $\omega_{err}$, and current I. In some implementations, the stable region $\epsilon(P)$ may be expressed as an n-dimensional ellipse. For example, as shown in FIG. 10A, the stable region $\Xi(P)$ may be expressed as a three-dimensional ellipse. Similarly, as shown in FIG. 10B, the initial region $\Xi_0$ may be expressed as an n-dimensional rectangular parallelepiped.

Figure 11A:
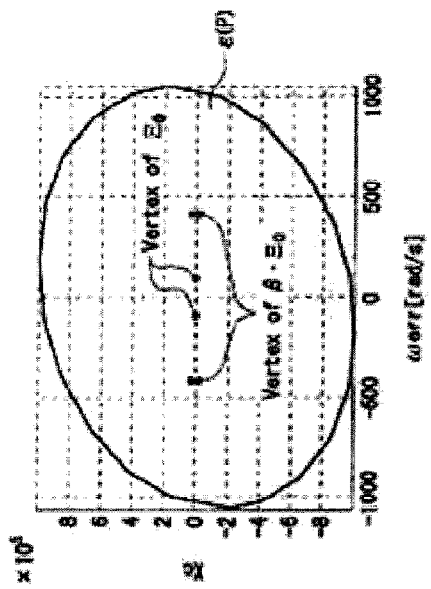
FIG. 11A shows an example projection view of a stable region $\epsilon(P)$ projected on a $\omega_{err}$-I plane.
Figure 11B:
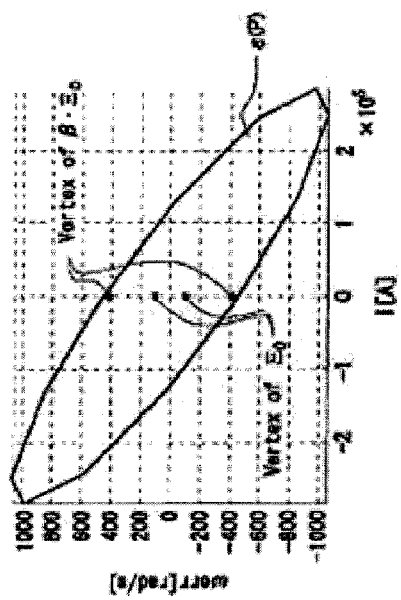
FIG. 11B shows an example projection view of a stable region $\epsilon(P)$ projected on a $X_c$-$\omega_{err}$ plane.
Figure 11C:
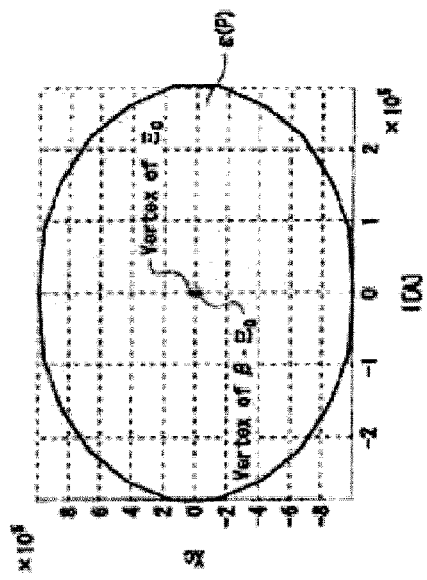
FIG. 11C shows an example projection view of a stable region $\epsilon(P)$ projected on a $X_c$-I plane.

FIG. 11A shows an example projection view of a stable region $\epsilon(P)$ projected on a $\omega_{err}$-I plane, FIG. 11B shows an example projection view of a stable region $\epsilon(P)$ projected on a $X_c$-$\omega_{err}$ plane, and FIG. 11C shows an example projection view of a stable region $\epsilon(P)$ projected on a $X_c$-I plane.

As shown in FIGS. 11A-11C, the gain determining section 230 may determine a feedback coefficient $K_{aw}$ which maximizes the margin $\beta$. In some implementations, determining a feedback coefficient $K_{aw}$ includes determining a feedback coefficient $K_{aw}$ such that each vertex, represented by $\beta \times \Xi_0$, may situate within the stable region $\epsilon(P)$.

The process of determining the feedback coefficient $K_{aw}$ which maximizes the margin $\beta$ will now be described. An error system is a system that defines the difference between the original dynamics of a system and the dynamics of the system in its steady state. In some implementations, the error system may be defined using a state equation and an output equation, which may be given by [3] and [4]:

$$x_p[k+1] - x_{pr} = A_P(x_p[k] - x_{pr}) + B_p \mathrm{sat}(v_c[k] - v_t) \qquad [3]$$

$$y[k] - r = C_p(x_p[k] - x_{pr}) \qquad [4]$$

where k indicates a k-th sample, $x_p[k]$ indicates a state vector of the controlled device represented by an $n_p$-dimensional real-number matrix, $v_c[k]$ indicates an input vector represented by an m-dimensional real-number matrix (this input vector may function as the control signal output by the controller 100), y[k] indicates an output vector represented by a p-dimensional real-number matrix (this output vector may function as a physical value of the controlled device), $v_r$ indicates a vector of an external force represented by an m-dimensional real-number matrix, $x_{pr}$ indicates a state vector of the controlled device in its steady state represented by the $n_p$-dimensional real-number matrix, r indicates an output vector in a steady state represented by the p-dimensional real-number matrix (this output vector may function the desired value of the physical value), and $A_p$, $B_p$, and $C_p$ each indicate a constant matrix. The function sat(v) may be defined by [5]:

$$sat(v) = \begin{cases} -\mu_0 & \text{for} \quad v < -\mu_0 \\ v & \text{for} \quad -\mu_0 < v < \mu_0 \\ \mu_0 & \text{for} \quad \mu_0 < v \end{cases} \quad [5]$$

The state equation and output equation of the error system of the controller 100 may be given by [6] and [7]:

$$x_c[k+1]-x_{cr}=A_c(x_c[k]-x_{cr})+B_c(r-y[k])+E_c(sat(v_c(t)-v_r)-(v_c(t)-v_r)) \quad [6]$$

$$v_c[k]-v_r=C_c(x_c[k]-x_{cr})+D_c(r-y[k]) \quad [7]$$

where $x_c[k]$ indicates a state vector of the controller 100 represented by an $n_p$-dimensional real-number matrix, $v_c[k]$ indicates an output vector represented by an m-dimensional real-number matrix, $x_{cr}$ indicates a state vector of the controller 100 in its steady state represented by an $n_c$-dimensional real-number matrix, $E_c$ indicates a matrix representing a feedback coefficient $K_{aw}$, and $A_c$, $B_c$, $C_c$, and $D_c$ each indicate a constant matrix. The function $sat(v_c(k)-v_r)$ may be defined by [8].

$$sat(v_c[k]-v_r) = \begin{cases} -\mu_0 & \text{for} \quad v_c[k]-v_r < U_{min}-v_r = -\mu_0 \\ v_c[k]-v_r & \text{for} \quad -\mu_0 < v_c[k]-v_r < U_{max}-v_r = \mu_0 \\ \mu_0 & \text{for} \quad \mu_0 < v_c[k] \end{cases} \quad [8]$$

A state equation of a system obtained by merging the controller 100 and the controlled device may therefore be obtained from [3], [4], [6] and [7] to establish [9]:

$$\xi[k+1]=A\xi[k]-(B+RE_c)\phi(K\xi[k]) \quad [9]$$

where:

$$\xi[k] = \begin{bmatrix} x_p[k]-x_{pr} \\ x_c[k]-x_{cr} \end{bmatrix} \subseteq R^{n_p+n_c} : \text{extended state vector}$$

$\phi(v)=v-sat(v)$: dead zone function $$A = \begin{bmatrix} A_p-B_pD_cC_p & B_pC_c \\ -B_cC_p & A_c \end{bmatrix}$$

$$B = \begin{bmatrix} B_p \\ 0 \end{bmatrix}$$

$$R = \begin{bmatrix} 0 \\ I_{n_c} \end{bmatrix}$$

$K=[-D_cC_pC_c]$

A matrix G may be defined as [10]:

$$G \subseteq R^{m \times (n_p+n_c)} \quad [10]$$

A polyhedron J also may be defined as [11]:

$$J=\{\xi \subseteq R^{n_p+n_c}; -\mu_0 \leq (K-G)\xi \leq \mu_0\} \quad [11]$$

Establishing [12]:

$$\xi \subseteq J \quad [12]$$

a positive constant matrix T may be given by [13]:

$$\phi(K\xi)'T[\phi(K\xi)-G\xi] \leq 0 \quad [13]$$

where T may be defined as [14]:

$$T \subseteq R^{m \times m} \quad [14]$$

Establishing the following relationship [15]:

$G=YP$ $$Y \subseteq R^{m \times (n_p+n_c)} \quad [15]$$

the term $\mu_0^2$ may be defined as [16]:

$$\mu_0^2 > \xi'(K'-W^{-1}Y)(K-YW^{-1})\xi \quad [16]$$

where the following definition [17] is used:

$$P=W^{-1} \quad [17]$$

A linear matrix inequality (LMI) problem may be assumed, which may be defined by the following inequality [18]:

$$\begin{bmatrix} W & WK'-Y' \\ KW-Y & \mu_0^2 \end{bmatrix} \geq 0 \quad [18]$$

Based on a Schur's complementary matrix, the following inequality [19] may be defined as:

$$\xi'W^{-1}\xi \cdot \mu_0^2 > \xi'(K'-W^{-1}Y)(K-YW^{-1})\xi \quad [19]$$

An ellipse $\epsilon(P)$ also may be assumed, which may be represented by [20]:

$$\epsilon(P)=\{\xi \subseteq R^{n_p+n_c}; \xi'P\xi \leq 1\} \quad [20]$$

If the inequality [18] is satisfied, the ellipse $\epsilon(P)$ defined in equation [20] may be included in the polyhedron J defined by equation [11] based on equation [16] and equation [19]. The stable region calculating section 210 may calculate the stable region $\epsilon(P)$ based on equation [20].

A symmetric positive matrix P will now be assumed, which may be defined as [21]:

$$P \subseteq R^{(n_p+n_c) \times (n_p+n_c)} \quad [21]$$

Further, a quadratic Lyapunov function given by the equation [22] will be assumed:

$$V\xi[k])=\xi[k]'P\xi[k] \quad [22]$$

The variation of the function defined in equation [22] may be represented using equation [9] to create [23]:

$$\Delta V(\xi[k])=V(\xi[k])-V(\xi[k+1])=\xi[k]'P\xi[k]-\xi[k]'(A'PA)\xi[k]2\xi[k]'A'P(B+RE_e)\phi(K\xi[k])-\phi(K\xi[k])'(B+RE_c)P(B+RE_c)\phi(K\xi[k]) \quad [23]$$

Using equation [13] and equation [23], the following inequality [24] may be defined:

$$\Delta V(\xi[k]) \ge \xi[k]'P\xi[k] - \xi[k]'(A'PA)\xi[k] + 2\xi[k]'A'P(B+RE_c)\phi(K\xi[k]) - \phi(K\xi[k])'(B+RE_c)'P(B+RE_c)\phi(K\xi[k]) + 2\phi(k\xi[K])'t[\phi(k\xi[K]) - g\xi[K]]$$ [24]

Based on equation [23] and equation [24], the following relationship may be established:

$$\Delta V(\xi[k]) \ge [\xi' \quad \varphi'] \begin{bmatrix} X_1 & X_2 \\ X_2' & X_3 \end{bmatrix} \begin{bmatrix} \xi \\ \varphi \end{bmatrix}$$ [25]

where:
$X_1 = P - A'PA$
$X_2 = A'P(B + RE_c) - G'T$
$X_3 = 2T - (B + RE_c)'P(B + RE_c)$
and:

$$\Delta V(\xi[k]) \ge 0$$

In this case, the energy of the system represented by the state equation in equation [9] will gradually decrease along with the transition of the state, and the system will subsequently converge to a predetermined state.

To establish:

$$\Delta V(\xi[k]) \ge 0$$ [26]

the following equation [27] also should be established from equation [25]:

$$\begin{bmatrix} X_1 & X_2 \\ X_2' & X_3 \end{bmatrix} > 0$$ [27]

Based on a Schur's complementary matrix, the following relationship [28] may be established from the equation [27]:

$$\begin{bmatrix} W & -Y' & -WA' \\ -Y & 2S & SB' + Z'R' \\ -AW & BS + RZ & W \end{bmatrix} > 0$$ [30]

where:
$W \subseteq R^{(n_p+n_c) \times (n_p+n_c)}$
$Y \subseteq R^{m \times (n_p+n_c)}$
$S \subseteq R^{m \times m}$
$Z \subseteq R^{n_c \times m}$
$G = YP$
$P = W^{-1}$
$E_c = ZS^{-1}$ From the above, if equation [28] and equation [18] are satisfied, the stable region $\epsilon(P)$ will include the initial region $\Xi_0$. Note that the initial region $\Xi_0$ may be defined by [29]:

$$\Xi_0 = Co\{\mu_r \subseteq R^{n_p+n_c}; r=1,2,\ldots,n_r\}$$ [29]

The initial region calculating section 220 may calculate the initial region $\Xi_0$ based on equation [29]. $E_c$, which may be used to maximize $\beta$ and represented by the following relationship, will now be assumed.

$$\beta \cdot \Xi_0 \subseteq \epsilon(P)$$ [30]

That is, $E_c$, which satisfies the following relationship, may be obtained based on LMI.

$$\min_{W,Z,S,Y,\mu} \mu \quad \text{subject\_to} \quad (i) \begin{bmatrix} W & -Y' & -WA' \\ -Y & 2S & SB' + Z'R' \\ -AW & BS + RZ & W \end{bmatrix}$$ [32]

$$(ii) \begin{bmatrix} W & W' - Y' \\ K'W - Y & \mu_0^2 \end{bmatrix} \ge 0$$

$$(iii) \begin{bmatrix} \mu & \eta_r' \\ \eta_r & W \end{bmatrix} \ge 0 \quad r = 1, 2, \ldots, n_r$$

where:

$\beta = 1/\sqrt{\mu}$

The gain determining section 230 may calculate the feedback coefficient $K_{aw}$ based on equation [32]. By the process described above, the feedback coefficient $K_{aw}(E_c)$, which maximizes the margin ($\beta$) of the stable region $\epsilon(P)$, can be obtained.

Figure 12:
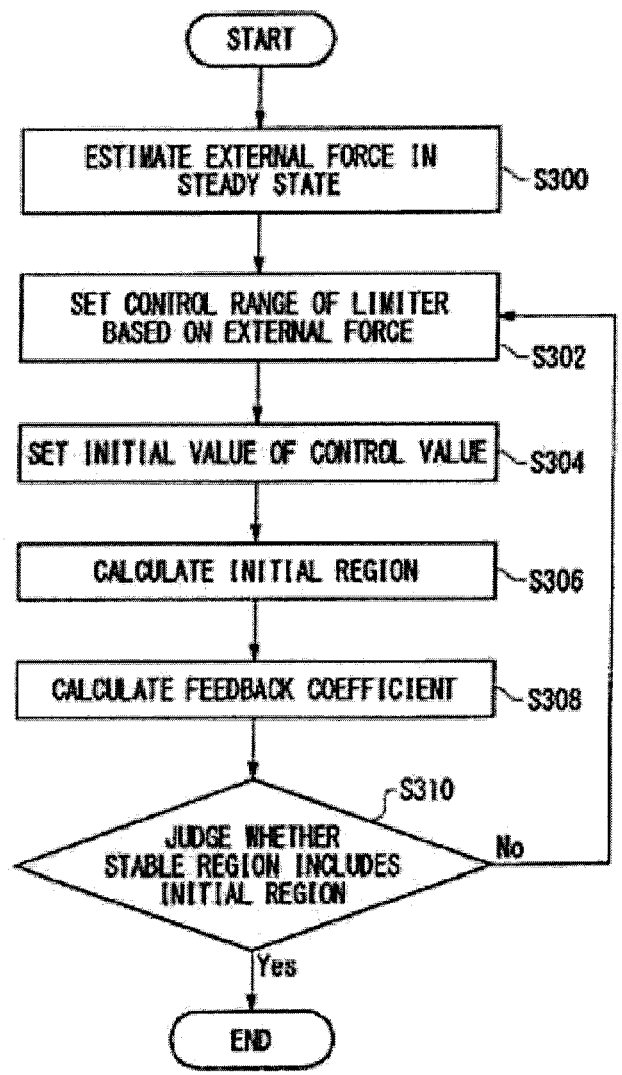
FIG. 12 is a flowchart showing an example process performed by the design support apparatus 200 shown in FIG. 9.

FIG. 12 is a flowchart showing an example process performed by, for example, the design support apparatus 200. As shown, the design support apparatus 200 estimates an external force applied to the controlled device while the device is in a steady state (S300). For example, the design support apparatus 200 measures the regulated value $U_{out}$ output by the limiter 50 as the controlled device enters the steady state, as described with respect to FIG. 3.

Next, the design support apparatus 200 sets the control range of the limiter 50 based on the estimation performed in step S300 (S302). The design support apparatus 200 may set the range value $U_r$ as the center value Ur of the control range as well as the values for the upper limit $U_{max}$, the lower limit $U_{min}$, as described with respect to FIG. 4.

The design support apparatus 200 sets the initial value $X_{c0}$ of the control value $U_{in}$ generated by the control section 10 when the controller 100 switches from feedforward control to feedback control (S304). In some implementations, the design support apparatus 200 may set the feedforward value output by the feedforward section 70 at the time of switching as the initial value $X_{c0}$, as described with respect to FIG. 5.

Subsequently, the initial region calculating section 220 calculates the initial region $\Xi_0$ (S306). In some implementations, the initial region calculating section 220 may calculate the initial region $\Xi_0$ based on equation [29]. For example, the initial region $\Xi_0$ calculated by the initial region calculating section 220 may be represented by [33]:

$$\Xi_0 = Co\left\{ \begin{Bmatrix} +i_0 \\ +\omega_0 \\ +X_{c0} \end{Bmatrix}, \begin{Bmatrix} -i_0 \\ +\omega_0 \\ +X_{c0} \end{Bmatrix}, \begin{Bmatrix} +i_0 \\ -\omega_0 \\ +X_{c0} \end{Bmatrix}, \begin{Bmatrix} +i_0 \\ +\omega_0 \\ -X_{c0} \end{Bmatrix}, \begin{Bmatrix} -i_0 \\ -\omega_0 \\ +X_{c0} \end{Bmatrix}, \begin{Bmatrix} +i_0 \\ -\omega_0 \\ -X_{c0} \end{Bmatrix}, \begin{Bmatrix} -i_0 \\ +\omega_0 \\ -X_{c0} \end{Bmatrix}, \begin{Bmatrix} -i_0 \\ -\omega_0 \\ -X_{c0} \end{Bmatrix} \right\}$$ [33]

where:

$i_0 = 1.2 i^*_0, \omega_0 = 1.2\omega^*_0, X_{c0} = 1.2 X^*_{c0}$ [34]

The following expression [35] may be used to indicate the initial values of the current consumed by the spindle of the hard disk, the rotation velocity of the spindle, and the control value generated by the control section 10, when the controller 100 switches to feedback control:

$i^*_0, \omega^*_0, X^*_{c0}$ [35]

Next, the gain determining section 230 calculates the feedback coefficient $K_{aw}$ (S308). The gain determining section 230 may calculate the feedback coefficient $K_{aw}$ based on $E_c$ which can be determined via equation [32]. Using the calculated $E_c$, the gain determining section 230 may calculate the feedback coefficient $K_{aw}$ based on the following equation [36]:

$$K_{aw} = E_c / K_{lpg} \quad [36]$$

Next, the gain determining section 230 checks whether the stable region $\epsilon(P)$ defined by the feedback coefficient $K_{aw}$ includes the initial region $\Xi_0$ (S310). The gain determining section 230 may alternatively check whether the margin $\beta$ of the stable region $\epsilon(P)$ with respect to the initial region $\square_0$ (which in one implementation corresponds to the calculated feedback coefficient $K_{aw}$) is larger than a predetermined value. In some implementations, determining whether the stable region $\epsilon(P)$ includes the initial region $\Xi_0$ includes determining whether $\beta$ is larger than 1.

Where the stable region $\epsilon(P)$ includes the initial region $\Xi_0$, in some implementations, the gain determining section 230 may utilize the calculated feedback coefficient $K_{aw}$ as the coefficient for the feedback coefficient multiplier 44, and complete the process. Thereafter, the gain determining section 230 sets the initial value $X_{c0}$, the center value $U_r$, the upper limit $U_{max}$, and lower limit $U_{min}$ of the limiter's control range as the initial parameters for the controller 100.

Where the stable region $\epsilon(P)$ does not include the initial region $\Xi_0$, in some implementations, the design support apparatus 200 modifies the initial value $X_{c0}$, the center value $U_r$, the upper limit $U_{max}$, and lower limit $U_{min}$ of the limiter's control range, and repeats the process beginning from step S302. For example, where the margin 3 corresponding to the feedback coefficient $K_{aw}$ calculated at step S308 is smaller than 1, the design support apparatus 200 can modify the initial value $X_{c0}$, and repeats the process shown in FIG. 12.

If the upper limit $U_{max}$, and lower limit $U_{min}$ of the control range are changed, the range enclosed by the stable region $\epsilon(P)$ may be affected as shown by equations [3], [4], [6], [7], [9], [11], [13], [16], [18] and [19]. Thus, in some implementations, before repeating the process, the design support apparatus 200 may re-set the upper limit $U_{max}$, and lower limit $U_{min}$ such that the difference between the upper limit $U_{max}$, and lower limit $U_{min}$ becomes a larger value than the difference before re-setting so that the region enclosed by the stable region $\epsilon(P)$ may become larger.

Further, if the initial value $X_{c0}$ is changed, the initial region $\Xi_0$ also may change as shown by equations [29] and [30]. Thus, in some implementations, before repeating the process, the design support apparatus 200 may re-set the initial value $X_{c0}$ to be a value closer to the desired value, so that the initial region $\Xi_0$ may become smaller.

Alternative Configuration of Design Support Apparatus

Figure 13:
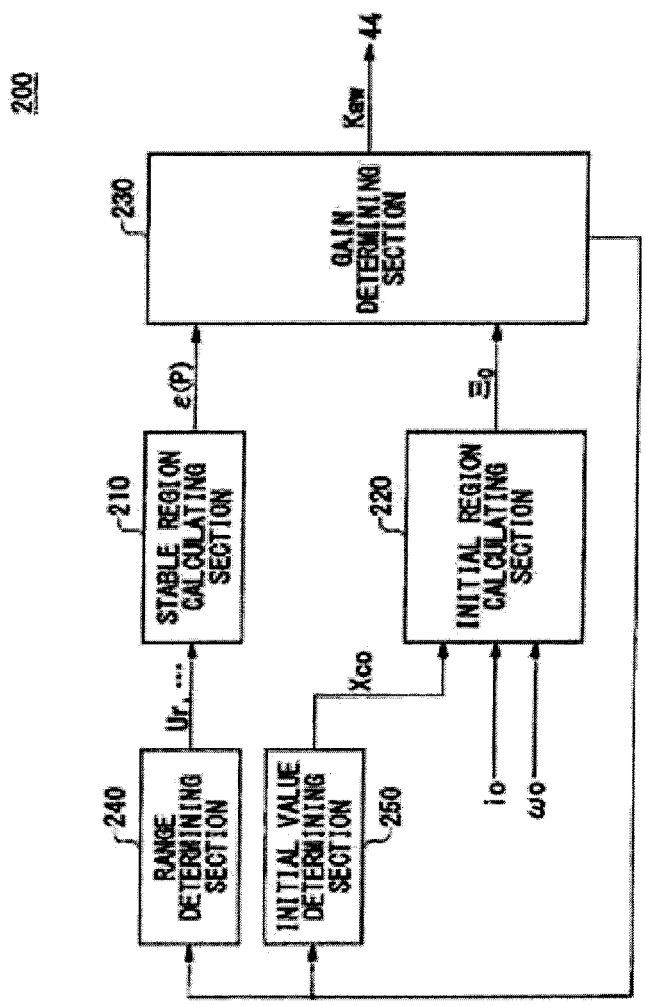
FIG. 13 is a block diagram showing an alternative configuration of the design support apparatus 200 shown in FIG. 9.

FIG. 13 is a diagram showing an alternative configuration of the design support apparatus 200. As shown, the design support apparatus 200 further includes a range determining section 240 and an initial value determining section 250. The remaining components may be essentially identical to those shown in FIG. 9.

Range Determining Section

The range determining section 240 may be configured to determine the control range of the limiter 50. As described with respect to FIG. 12, the range determining section 240 may be used to re-set the upper limit $U_{max}$, and lower limit $U_{min}$ of the control range when the margin $\beta$ corresponding to the feedback coefficient $K_{aw}$ (generated by the gain determining section 230) is smaller than a predetermined value. For example, the range determining section 240 may initially supply a predetermined value, and change the upper limit $U_{max}$, and lower limit $U_{min}$ when the margin $\beta$ is smaller than the predetermined value. Further, a variable range within which the upper limit $U_{max}$, and lower limit $U_{min}$ can be changed may be set in advance by the range determining section 240. In some implementations, the range determining section 240 may modify the upper limit $U_{max}$, and lower limit $U_{min}$ such that the upper limit $U_{max}$, and lower limit $U_{min}$ are equidistant from the center value $U_r$.

Initial Value Determining Section

The initial value determining section 250 may be configured to determine the initial value $X_{c0}$ of the control section 10. As described with respect to FIG. 12, the initial value determining section 250, in some implementations, may be used to re-set the initial value $X_{c0}$ of the control value $U_{in}$ when the margin $\beta$ corresponding to the feedback coefficient $K_{aw}$ (generated by the gain determining section 230) is smaller than a predetermined value. For example, the initial value determining section 250 may initially identify the predetermined value, and change the initial value $X_{c0}$ when the margin $\beta$ is smaller than the predetermined value. Further, a variable range within which the initial value $X_{c0}$ can be changed may be set in advance by the initial value determining section 250.

In some implementations, the range determining section 240 and the initial value determining section 250 may simultaneously modify associated settings to change the control range ($U_{max}$, $U_{min}$) and the initial value $X_{c0}$ when the margin $\beta$ is smaller than a predetermined value. In these implementations, a priority scheme may be employed for prioritizing such modifications. For example, the range determining section 240 may effectuate changes to the control range ($U_{max}$, $U_{min}$) before the initial value determining section 250 modifies the initial value $X_{c0}$. As another example, if the initial value $X_{c0}$ has a greater margin than that of the control range ($U_{max}$, $U_{min}$), the initial value determining section 250 may modify its associated setting before the range determining section 240 changes its associated setting.

The design support apparatus 200 can set the feedback coefficient $K_{aw}$ of the controller 100 described with respect to FIGS. 1 to 8 to an optimum value. Where there is no feedback coefficient $K_{aw}$ available that satisfies a given margin condition with a particular control range ($U_{max}$, $U_{min}$) and the initial value $X_{c0}$, the design support apparatus 200, in some implementations, may re-set these parameters to appropriate values to allow for an optimum feedback coefficient $K_{aw}$.

Figure 14:
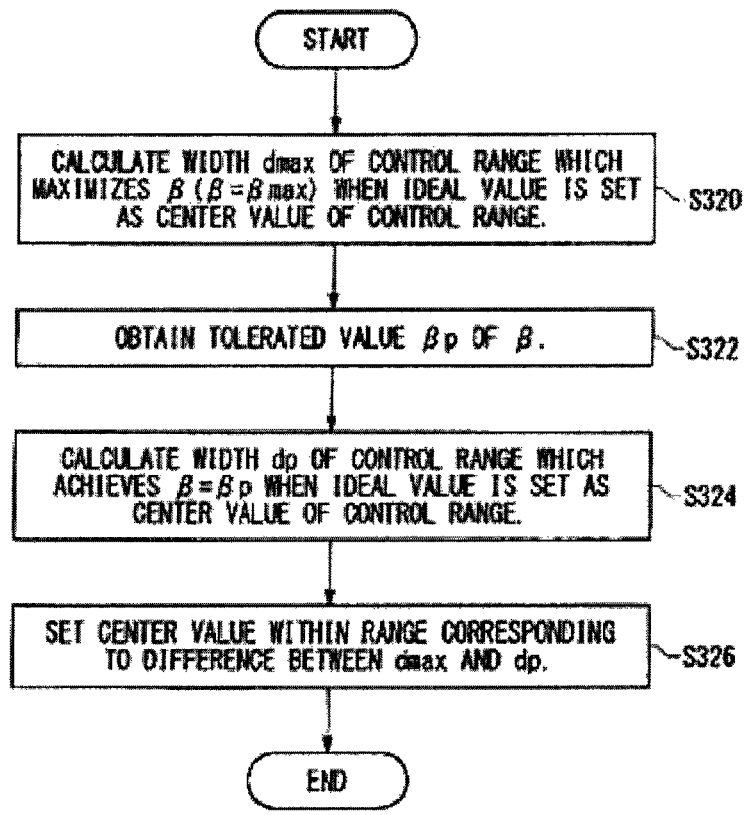
FIG. 14 shows an example flowchart for setting a center value of the control range of the limiter 50.

FIG. 14 shows an example flowchart for setting a center value of the control range of the limiter 50. Hereinafter, the control value $U_r$ in the steady state of the controlled device will be referred to as an ideal value. Also, the parameter as described in FIG. 12 may be set such that the margin $\beta$ of the stable region with respect to the initial region $\Xi_0$ is at maximum ($\beta = \beta_{max}$). Where a small margin $\beta$ is tolerated (e.g., $\beta p < \beta_{max}$), the design support apparatus 200 may set a center value within a range corresponding to this tolerated value $\beta p$. This tolerated value $\beta p$ may be obtained, for example, from the specification of the controlled device. Alternatively, the tolerated value 13$p$ may be obtained based on one or more operating parameters associated with the controlled device.

Referring to FIG. 14, the design support apparatus 200 calculates a width $d_{max}$ of the control range associated with a maximum margin β when the ideal value is set as the center value of the control range (S320). For example, the design support apparatus 200 may successively change the width $d_{max}$ of the control range and calculate the stable region ϵ(P) for each width of the control range. Then, the design support apparatus 200 calculates the margin β of each calculated stable region ϵ(P) with respect to the initial region $Ξ_0$, and identifies the largest β as $d_{max}$.

In some implementations, the feedback coefficient used for calculating the stable region ϵ(P) may be calculated in advance by the design support apparatus 200 (or may be determined by user). For example, the design support apparatus 200 may calculate the feedback coefficient used in step S320 by performing the process described in FIG. 12 using the range value $U_r$ and the width $d_{max}$ of the control range.

The design support apparatus 200 obtains a tolerated value βp of the margin β (S322). Again, the tolerated value βp may, for example, be obtained from the specification of the controlled device. Alternatively, the tolerated value βp may be obtained based on one or more operating parameters associated with the controlled device. In some implementations, the design support apparatus 200 may be given a tolerated value βp whose absolute value is smaller than the maximum margin $β_{max}$.

The design support apparatus 200 calculates a width $d_p$ of the control range which corresponds to the tolerated value Pp when the ideal value is set as the center value of the control range (S324). For example, the design support apparatus 200 may successively change the width of the control range and calculate the stable region ϵ(P) for each width of the control range. Subsequently, the design support apparatus 200 may calculate the margin of each calculated stable region ϵ(P) with respect to the initial region $Ξ_0$, and identify the width that corresponds to the tolerated value βp as the width $d_p$.

The design support apparatus 200 sets the ideal value (range value $U_r$) as the center value of the control range of the limiter 50 and which corresponds to the difference between $d_{max}$ and $d_p$, (S326). For example, assuming that $L=d_{max}-d_p$, the range determining section 240 may set the center value within a range of Ur−L to Ur+L. Of course, the ideal value need not be set as the center value but one which is bound within the range. In such a case, the center value may be determined based on the range defined by the margin γ.

While this specification contains many specifics, these should not be construed as limitations on the scope of what being claims or of what may be claimed, but rather as descriptions of features specific to particular embodiments. For example, the above descriptions also are applicable for controlling the controlled device where an output to the controlled device has reached saturation. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the scope of the invention.

What is claimed is:

1. A controller comprising:
   a control section which generates a control value for controlling a controlled device;
   a limiter which receives the control value and generates a regulated value, wherein the regulated value is within a predetermined control range, the predetermined control range including a predetermined range value and an offset, the offset being used to define a relationship between the predetermined range value and a predetermined maximum or a relationship between the predetermined range value and a predetermined minimum;
   an adjusting section which adjusts the control value through feedback control based on a difference between the control value and the regulated value;
   a state control section which controls the controlled device based on the regulated value to allow the controlled device to operate in a steady state; and
   a setting section which controls the limiter based on whether the regulated value is sufficient to allow the controlled device to operate in the steady state, wherein the setting section is configured to set the regulated value as the predetermined range value if the regulated value meets one or more parameters used to place the controlled device in the steady state.

2. The controller of claim 1, wherein the control section generates the control value based on a difference between a physical value and a desired value associated with the controlled device.

3. The controller of claim 1, wherein the limiter generates the regulated value based on the adjusted control value.

4. The controller of claim 1, where the controlled device operates in the steady state when an attribute of the controlled device converges to a desired value.

5. The controller of claim 4, wherein the attribute includes one of rotation velocity of a spindle motor of a hard disk drive and a back electromotive force.

6. The controller of claim 1, wherein the control section further comprises:
   an input to receive an error difference;
   a first delaying section to delay the error difference;
   a first adder to combine the delayed difference with the error difference; and
   a multiplier to generate the control value based on the combined delayed difference and error difference.

7. The controller of claim 1, wherein the limiter operates in the predetermined control range, the predetermined control range including the predetermined maximum and the predetermined minimum.

8. The controller of claim 7, wherein if the control value is greater than the predetermined maximum, the limiter outputs the predetermined maximum as the regulated value; and wherein if the control value is smaller than the predetermined minimum, the limiter outputs the predetermined minimum as the regulated value.

9. The controller of claim 1, wherein the setting section is further configured to set the predetermined range value as a center value of the predetermined control range to stabilize the controlled device.

10. The controller of claim 1, wherein the state control section includes a digital-analog converter which converts the regulated value to an analog voltage value, and the controlled device is controlled based on the analog voltage value.

11. The controller of claim 1, wherein the adjusting section generates an adjustment value, and adjusts the control value based on the adjustment value if the control value falls outside the predetermined control range to minimize the difference between the control value and the regulated value.

12. The controller of claim 1, further comprising:
a feedforward section to generate a feedforward value,
wherein the state control section controls the controlled device based on at least one of the feedforward value or the regulated value.

13. The controller of claim 12, where the state control section controls the controlled device based on the regulated value only when the feedforward value has reached a predetermined value.

14. The controller of claim 13, wherein the predetermined value is more than 80% of a desired value needed to allow the controlled device to operate in the steady state.

15. The controller of claim 12, further comprising:
an initial value storage section to store one or more initial values, the one or more initial values being used as an initial value of the control value.

16. A method comprising:
generating a control value for controlling a controlled device;
generating a regulated value from the control value using a limiter, wherein the regulated value is within a predetermined control range, the predetermined control range including a predetermined range value and an offset, the offset being used to define a relationship between the predetermined range value and a predetermined maximum or a relationship between the predetermined range value and a predetermined minimum;
adjusting the control value through feedback control based on a difference between the control value and the regulated value;
controlling the controlled device based on the regulated value to allow the controlled device to operate in a steady state;
adjusting the regulated value when the regulated value is insufficient to allow the controlled device to operate in the steady state; and
setting the regulated value as the predetermined range value if the regulated value meets one or more parameters used to place the controlled device in the steady state.

17. The method of claim 16, where controlling the controlled device includes:
generating the control value based on a difference between a physical value and a desired value associated with the controlled device.

18. The method of claim 16, where generating the regulated value includes generating the regulated value based on the adjusted control value.

19. The method of claim 16, where controlling the controlled device includes controlling the controlled device in the steady state such that an attribute of the controlled device converges to a desired value.

20. The method of claim 19, wherein the attributes includes one of rotation velocity of a spindle motor of a hard disk drive and a back electromotive force.

21. The method of claim 16, further comprising:
receiving an error difference;
delaying the error difference;
combining the delayed difference with the error difference; and
generating the control value based on the combined delayed difference and error difference.

22. The method of claim 16, further comprising:
setting the regulated value in the predetermined control range associated with the limiter, wherein the predetermined control range includes the predetermined maximum and the predetermined minimum.

23. The method of claim 22, further comprising:
outputting the predetermined maximum associated with the predetermined control range as the regulated value if the control value is greater than the predetermined maximum; and
outputting the predetermined minimum associated with the predetermined control range as the regulated value if the control value is smaller than the predetermined maximum.

24. The method of claim 16, further comprising:
converting the regulated value to an analog voltage value,
where controlling the controlled device includes controlling the controlled device based on the analog voltage value.

25. The method of claim 16, where adjusting the control value through feedback control based on the difference between the control value and the regulated value includes:
generating an adjustment value if the control value falls outside the predetermined control range to minimize the difference between the control value and the regulated value; and
adjusting the control value based on the adjustment value.

26. The method of claim 16, further comprising:
generating a feedforward value,
where controlling the controlled device based on the regulated value includes controlling the controlled device based on the feedforward value and the regulated value.

27. The method of claim 26, where controlling the controlled device based on the feedforward value and the regulated value includes controlling the controlled device based on only the regulated value when the feedforward value has reached a predetermined value.

* * * * *